United States Patent Office 3,171,860
Patented Mar. 2, 1965

3,171,860
METHOD OF PRODUCING CUMENE HYDRO-
PEROXIDE
Franco Codignola, Milan, Italy, assignor to Societa
Italiana Resine, Milan, Italy
No Drawing. Filed Sept. 7, 1960, Ser. No. 54,347
Claims priority, application Italy, July 1, 1960, 10,155
4 Claims. (Cl. 260—610)

This invention concerns an improved method of producing cumene hydroperoxide. A number of methods of preparing cumene hydroperoxide are known and used in industry. It is well-known that oxidation of pure cumene with molecular oxygen or mixtures containing it, such as atmospheric air cannot be carried out on an industrial scale on account of the fact that the rate of reaction is very low and tends to decrease with time.

Reaction includes at the start a considerable induction period which can be overcome by starting the reaction in the presence of small quantities of cumene hydroperoxide which serves as a reaction starter. Low rates of reaction with the use of pure cumene even in the presence of cumene hydroperoxide, which tend to rapidly decrease with time, are due to the formation of acid by-products which excessively slow down the reaction rate.

In order to obviate this drawback, methods have been developed for carrying out the cumene oxidizing reaction in the presence of alkaline substances, in the presence or absence of water.

Alkaline substances are usually caustic soda, sodium carbonate, calcium carbonate and the like.

Though the presence of such basic substances increases the rate of reaction and avoids its decrease, it is the cause of considerable difficulties. The presence of free alkaline substances increases degradation of hydroperoxide, so that the oxidation output in respect of cumene is not particularly favourable. For cumene hydroperoxide obtained by any of the abovementioned methods constantly contains as an average 12 to 18% of a mixture of acetophenone and dimethylphenyl carbinol.

In order to overcome said difficulties, applicant developed according to Italian application filed January 11, 1960, and corresponding U.S. patent application Serial No. 42,769, filed July 14, 1960, and now abandoned, a method of oxidizing cumene in the presence of monosodium salts of bicarboxylic, aliphatic or aromatic organic acid having a dissociation constant K of the first acid hydrogen not exceeding $10^{-5}$. Applicant discovered that, without introducing alkaline substances, or practically modifying the pH value of the oxidizing agent, oxidation being effected in the absence of water, said method yields excellent reaction rates even when acid by-products of the reaction set free the bicarboxylic acid from its monosodium salt. It was thereby possible to obtain cumene hydroperoxide of a much higher purity with considerable economical advantages as a result of the increased output.

Applicant now discovered a method by which extremely high reaction rates and excellent outputs can be obtained without practically introducing any foreign substance into the reaction agent.

The improved method comprises the step of carrying out the oxidizing reaction with atmospheric air at atmospheric pressure or above atmospheric pressure preferably in the absence of water, and in the presence of the sodium salt of cumene hydroperoxide. This affords the possibility of carrying out the reaction in the absence of products other than the reaction products, which would otherwise form, as mentioned above, large quantities of by-products. Even when the acid products displace the cumene hydroperoxide from its sodium salt, such cumene hydroperoxide implements the formation of cumene hydroperoxide from the reaction.

By coveniently selecting the quantity of the sodium salt of cumene hydroperoxide in the reaction mass, on completion of reaction practically all the cumene hydroperoxide introduced as a sodium salt is recovered as cumene hydroperoxide.

An evidence of the fact that this reaction is independent of the basic pH, which it was considered necessary to maintain during the course of reaction, is supplied by the fact that the reaction proceeds more satisfactorily and affords higher outputs, consequently a cumene hydroperoxide of higher purity by carrying out the reaction in the absence of water and carbon dioxide contained in the oxidation air. This avoids the formation even of slight traces of sodium carbonate from the sodium salt of cumene hydroperoxide, which sodium carbonate might raise the pH value of the reaction agent above neutrality.

As a result of the higher reaction rate the reaction can be carried out at lower temperatures than with conventional methods. As compared with conventional oxidation carried out under the same conditions with aqueous caustic soda, oxidation by the improved method permits of maintaining a temperature lower by 15° C. to obtain the same reaction rate. Comparison of the product obtained showed that, while with oxidation with soda the cumene hydroperoxide contained about 16% acetophenone and dimethylphenyl carbinol jointly, the cumene hydroperoxide obtained by the improved method contains only 4.3% of acetophenone and dimethylphenyl carbinol jointly. Consequently, it is possible by the improved method to maintain the reaction temperature below 100° C. against 110° C. required by prior methods in order to afford an industrially acceptable efficiency, the lower temperature affording considerable advantages in operation and output.

Of course, the reaction may be carried out in the presence of water and with air which has not been deprived of carbon dioxide; the method then still yields excellent results, which are superior to those afforded by the previously mentioned methods, though they are inferior to those obtained in the absence of water and carbon dioxide.

By absence of water I mean the use of ordinary cumene from the rectifying step of the production plant and of atmospheric air from a conventional compressor. Carbon dioxide in the air is removed by any of the conventional methods, such as by bubbling in a concentrated solution of caustic soda or in lime towers. The air deprived of carbon dioxide should be cleaned in order to avoid carrying along any foreign bodies.

The quantities of the sodium salt of cumene hydroperoxide required for satisfactory reaction are very low and can range between 0.05 and 0.5% by weight to the total cumene. Optimum values are obtained by maintaining the percentages of the sodium salt of cumene hydroperoxide around 0.1%.

It is worth while mentioning that practically all of the cumene hydroperoxide used as a sodium salt is recovered, so that the actual consumption thereof is reduced to infinitesimal quantities.

The reaction mixture issuing from the oxidizing apparatus is in industrial practice advantageously washed with a small quantity of water in order to remove residual traces of the sodium salt of cumene hydroperoxide and the sodium salt of the acid by-product formed in the course of the reaction.

The following examples are illustrative of the invention but should not be taken as a limitation thereof.

*Example No. 1*

5 kgs. cumene is introduced into an oscillating autoclave of stainless steel AISI 304 together with 5 gr. monosodium salt of cumene hydroperoxide. Stirring is started while the temperature is brought to 95° C., and air deprived of carbon dioxide and cleaned is injected up to 6 effective atmospheres. The addition of air is repeated until a quantity of oxygen corresponding to 200 liters (760 mm. 0° C.) is reached.

Reaction is completed in about 6 hours. The reaction product is cooled and discharged, its cumene hydroperoxide content amounting to 25.3%.

The cumene hydroperoxide prepared as above contains 4.02% acetophenone and 2.3% dimethylphenyl carbinol.

*Example No. 2*

A column 300 mm. in bore and 3,000 mm. in height of stainless steel AISI 304 equipped with a reflux cooler, automatic expansion valve at the coolant outlet and automatic analyser for the oxygen content in the exhausted air is filled with 100 liters cumene containing about 0.1% of the sodium salt of cumene hydroperoxide.

Heating to 95° C. is effected by means of an outer jacket on reaching said temperature, injection of air is started until the effective pressure at the outlet is 5 atms. At this stage cument containing 0.1% by weight of cumene hydroperoxide is injected at a rate of 85 liters/h., the air injection being adjusted so that the exhausted air contains about 5 or 6% residual oxygen. Both injection of cumene and air are effected on the bottom of the column, cumene being preferably injected slightly higher than air.

The previously oxidized liquid which is washed with a small quantity of water and subsequently decanted in a continuous decanter is filled continuously by means of a level adjuster. A cumene hydroperoxide solution with a 24.5% content by weight is obtained. The resulting hydroperoxide contains about 2.47% acetophenone and 1.9% dimethylphenyl carbinol.

What I claim is:

1. The process wherein cumene is oxidized in liquid phase to cumene hydroperoxide in the presence of an accelerator consisting of at least 0.05 part by weight of sodium salt of cumene hydroperoxide referred to 100 parts by weight total cumene, and in the absence of free alkaline substances.

2. The process wherein cumene is oxidized in liquid phase to cumene hydroperoxide in the presence of an accelerator consisting of 0.05 to 0.5 part by weight of sodium salt of cumene hydroperoxide referred to 100 parts by weight total cumene, and in the absence of free alkaline substances.

3. The process wherein cumene is oxidized in liquid phase to cumene hydroperoxide by means of an accelerator consisting of air in the presence of about 0.1 part by weight of sodium salt of cumene hydroperoxide referred to 100 parts by weight total cumene, and in the absence of free alkaline substances at a temperature between 70° and 120° C.

4. The process wherein cumene is oxidized in liquid phase to cumene hydroperoxide by means of $CO_2$-free air in the presence of an accelerator consisting of 0.05 to 0.5 part by weight of sodium salt of cumene hydroperoxide referred to 100 parts by weight total cumene at a temperature between 70° and 120° C., and in the absence of free alkaline substances.

References Cited by the Examiner

FOREIGN PATENTS 571,091    2/59    Canada.

LEON ZITVER, *Primary Examiner.*